United States Patent
Kajiura et al.

(10) Patent No.: US 6,794,599 B2
(45) Date of Patent: Sep. 21, 2004

(54) DEVICE AND METHOD FOR MANUFACTURE OF CARBONACEOUS MATERIAL

(75) Inventors: Hisashi Kajiura, Kanagawa (JP); Shigemitsu Tsutsui, Kanagawa (JP); Mitsuaki Miyakoshi, Kanagawa (JP); Yoshiyuki Hirano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/470,423

(22) PCT Filed: Feb. 25, 2002

(86) PCT No.: PCT/JP02/01647
§ 371 (c)(1),
(2), (4) Date: Jul. 28, 2003

(87) PCT Pub. No.: WO02/070405
PCT Pub. Date: Sep. 12, 2002

(65) Prior Publication Data
US 2004/0062992 A1 Apr. 1, 2004

(30) Foreign Application Priority Data
Mar. 1, 2001 (JP) ........................................ 2001-056330

(51) Int. Cl.⁷ ............................. B23K 15/00; H05B 7/22
(52) U.S. Cl. ..................................... 219/121.11; 373/62
(58) Field of Search ........................ 219/121.11, 121.12, 219/121.21, 121.33, 122, 383, 385, 390, 121.36, 121.54, 121.55, 121.56; 423/447.3, 445 B; 204/156, 173; 373/60, 62, 109, 110, 114; 427/571

(56) References Cited

U.S. PATENT DOCUMENTS

| | | | |
|---|---|---|---|
| 4,816,289 A | * 3/1989 | Komatsu et al. | ......... 423/447.3 |
| 5,059,757 A | * 10/1991 | Law et al. | ............. 219/121.36 |
| 5,478,608 A | * 12/1995 | Gorokhovsky | .............. 427/571 |
| 5,493,094 A | 2/1996 | Simmons | |
| 6,455,021 B1 | * 9/2002 | Saito | ....................... 423/447.3 |

FOREIGN PATENT DOCUMENTS

| | | |
|---|---|---|
| JP | 5-201715 | 8/1993 |
| JP | 6-157016 | 6/1994 |
| JP | 6-280116 | 10/1994 |
| JP | 7-189040 | 7/1995 |
| JP | 7-197325 | 8/1995 |
| JP | 8-217430 | 8/1996 |
| JP | 8-012310 | 12/1997 |
| JP | 2001-348215 | 12/2001 |
| WO | WO 93/13014 | 7/1993 |
| WO | WO 94/04461 | 3/1994 |

OTHER PUBLICATIONS

Sugai, et al., *Production of Single–Wall Nanotubes by High–Temperature Pulsed Arc Discharge: Mechanisms of their Production*, Jpn. J. Appl. Phys. vol. 38 (1999) pp. L477–L479.

Sugai, et al., *Production of fullerenes and single–wall carbon nanotubes by high–temperature pulsed arc discharge*, Journal of Chemical Physics, vol. 112, No. 13, Apr. 2000, pp. 6000–6005.

Koprinarov et al., *Fullerene structure synthesis by DC arc discharge in ferrocene vapours*, Vacuum 58 (2000) pp. 208–214.

* cited by examiner

Primary Examiner—Tu Ba Hoang
(74) Attorney, Agent, or Firm—Bell, Boyd & Lloyd LLC (57) ABSTRACT

An apparatus and method for manufacturing a carbonaceous material are provided. The carbonaceous material manufacturing apparatus includes a reaction tube and a gas supply portion. An anode and a cathode defining an arc discharge portion is placed in the reaction tube, and a capturer is located provided as well to capture carbonaceous materials generated. At the location of the capturer, an RF heater is disposed around the reaction tube. In a carbonaceous material manufacturing method, carbonaceous materials generated in the arc discharge portion are transported from a gas supply portion into the reaction tube by the gas supplied into the reaction tube, then heated by a RF heater in the capturer where the carbonaceous materials are not exposed to the atmospheric air, to thereby promote removal of impurities and growth of single-walled carbon nanotubes.

26 Claims, 7 Drawing Sheets

DEVICE AND METHOD FOR MANUFACTURE OF CARBONACEOUS MATERIAL

CROSS REFERENCE TO RELATED APPLICATIONS

This patent application claims priority to Japanese Patent Document No. P2001-056330 filed on Mar. 1, 2001, the disclosure of which is incorporated herein by reference.

BACKGROUND OF THE INVENTION

The present invention relates to a manufacturing method and a manufacturing apparatus of a carbonaceous material. More particularly, for the present invention relates to a manufacturing method and apparatus for single-walled carbon nanotubes or other carbonaceous materials by using arc discharge.

Carbon nanotubes are new materials first reported by S. Iijima in Nature, Vol. 354 (1991) 56 in 1991. Especially, single-walled carbon nanotubes (SWNT) have been figured out theoretically to change in electronic physicality from a metallic nature to a semiconductive nature, depending upon the way of winding of its helix, i.e. so-called chirality, and it is remarked as a hopeful electronic material of the next generation. Actually, there are various proposals of its applications to nanoelectronics materials, field electron emission emitters, highly directional radiation sources, soft X-ray sources, one-dimensional conduction materials, high-heat conduction materials, hydrogen storage materials, and others. Additionally, binding functional groups on surfaces, metal coating or containment of foreign substances will further expand the range of application of carbon nanotubes.

As a method of manufacturing single-walled carbon nanotubes and other carbonaceous materials, it has been proposed to compound a large mass of such materials by a so-called arc discharge process making use of arc discharge from a carbon rod as an electrode. This method produces carbonaceous materials by generating arc discharge in an arc discharge portion composed of juxtaposed anode and cathode.

Figure 1:
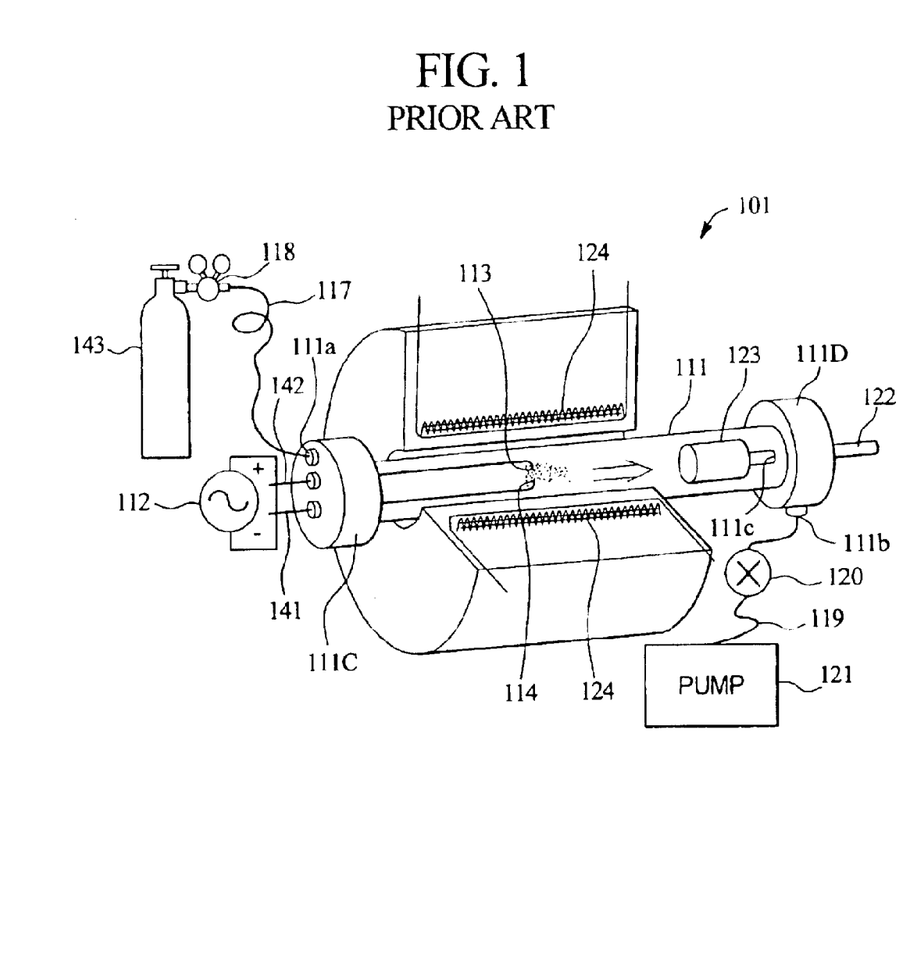
FIG. 1 is a schematic diagram showing a conventional carbonaceous material manufacturing apparatus.

An example of manufacturing apparatus of carbonaceous materials relying on an arc discharge process is shown in FIG. 1. The manufacturing apparatus 101 includes a cylindrical reaction tube 111 in which an anode 113 and a cathode 114 are juxtaposed via a light distance. The anode 113 is electrically connected to a positive-pole current inlet terminal 142, and the cathode 114 is electrically connected to a negative-pole current inlet terminal 141. These two current inlet terminals 141, 142 are electrically connected to a current supply portion 112 located outside the reaction tube 111 such that a voltage can be applied to the anode 113 and the cathode 114. The arc discharge portion is defined by distal ends where the anode 113 and the cathode 114 are opposed. The arc discharge portion is located approximately in the center of the reaction tube 111 in its axial direction, and an electric furnace 124 for heating the arc discharge portion is provided outside the portion of the reaction tube 111 aligned with the art discharge portion.

The anode 113 is a carbon electrode made of carbon added with a metal functioning as a catalyst such as iron, cobalt, nickel, lanthanum, or the like. The catalyst is used upon manufacturing carbonaceous materials such as single-walled carbon nanotubes by arc discharge. The cathode 114 is a pure carbon electrode containing no catalyst.

Caps 111C, 111D covering end portions of the reaction tube 111 are provided at opposite ends of the reaction tube 111 to be able to seal the interior of the reaction tube 111 from the atmospheric air. The cap 111C have a through hole 111a that penetrates it in the axial direction and permits communication between the interior and the exterior of the reaction tube 111. Connected to the through hole 111a is an inactive gas injector 143 via a hose 117. The inactive gas injector 143 can supply inactive gas such as He or Ar into the reaction tube 111. A flowmeter 118 is interposed in the hose 117 such that the velocity of the inactive gas injected into the reaction tube 111 can be changed.

The cap 111D has a through hole 111b penetrating it in the radial direction from its circumferential surface to permit communication between the interior and the exterior of the reaction tube 111. A pump 121 is connected to this through hole 111b via a hose 119. The pump 121 can discharge gas inside the reaction tube 111 to the exterior thereof by making use of a reduced pressure. A flowmeter 120 is interposed in the hose 119 such that the velocity of inactive gas, or the like, discharged from inside the reaction tube 111.

The cap 111D has another through hole 111c that penetrates it in the axial direction, and receives a double tube 122 penetrating and extending beyond it. Therefore, part of the double tube 122 resides in the reaction tube 111. On one of opposite end portions of the double tube 122 residing in the double tube 122, a capturer 123 for capturing carbonaceous materials produced in the arc discharge portion is mounted. The capturer 123 defined therein a space communicating with a space defined by the inner periphery of an outer tube and the outer periphery of an inner tube of the double tube 122, and a space communicating with a space defined by the inner periphery of the inner tube of the double tube 122. These two spaces are communicating with each other. In this configuration, when cooled water is supplied to the space defined by the inner periphery of the inner tube from one end of the double tube 122 opposite from the said end having the capturer 123, the cooled water passes through the space defined by the inner periphery of the inner tube, then reaches the inside of the capturer 123, cools the capturer 123 there, thereafter flows into the space defined by the inner periphery of the outer tube of the double tube 122 and the outer periphery of the inner tube thereof, and exits from the other end of the double tube 122.

Next explained is a method of manufacturing carbonaceous materials like single-walled carbon nanotubes. The anode 113 is made by crushing carbon to powder, then preparing a mixture of the powder carbon and powder of a catalyst such as iron, nickel, cobalt or lanthanum, shaping the mixture into the form of the anode 113, and sintering and/or machining it. The cathode 114 is made by directly shaping carbon into the form of the cathode 114. After that, the anode 113 and the cathode 114 are set in a carbonaceous material manufacturing apparatus 101, and the interior of the reaction tube 111 is once evacuated to a vacuum. After that, under the condition where an inactive gas injector 143 supplies inactive gas into the reaction tube and the pump 121 discharges the inactive gas from the reaction tube 111, that is, under the condition where a gas flow is made in the arc discharge portion, arc discharge is executed to produce a carbonaceous material such as single-walled carbon nanotubes from the carbon composing the anode 113 by catalysis of the catalyst. More specifically, in the arc discharge portion, metal and carbon simultaneously vaporize from the anode 113, and the vaporizing carbon appears as soot. The soot obtained contains graphite, amorphous carbon, catalytic metal, oxides of the catalytic metal, and others in addition to single-walled nanotubes. The soot containing carbonaceous materials such as single-walled carbon nanotubes produced in the arc reaction portion is transported to the capturer 123 located downstream by the flow of the supplied inactive gas.

In order to increase the recovery percentage of single-walled carbon nanotubes and other carbonaceous materials produced by the above-explained arc discharge method, various techniques have been disclosed heretofore.

According to Japanese Patent Laid-Open Publications Nos. hei 6-157016 and hei 6-280116, it is appreciated that the recovery percentage of single-walled carbon nanotubes by the arc discharge method largely depends upon the partial pressure of gas in the reaction tube where the single-walled carbon nanotubes are produced. Japanese Patent Laid-Open Publication No. hei 6-280116 discloses that the recovery percentage of single-walled nanotubes can be increased by maintaining the pressure of the inactive gas in the reaction tube in a range not lower than 200 Torr (about 26.7 kPa). Japanese Patent Laid-Open Publication No. hei 6-157016 discloses that the recovery percentage of single-walled carbon nanotubes can be optimized when the partial pressure of inactive gas in the reaction tube is in the range of 500 to 2500 Torr (approximately 66.7 to 333.3 kPa). Furthermore, Japanese Patent Laid-Open Publication No. hei 6-157016 discloses that it is possible to increase the recovery percentage of single-walled carbon nanotubes by adjusting the temperature of the arc discharge portion in the range of 1000° C. to 4000° C.

When single-walled carbon nanotubes are produced by the arc discharge method, carbonaceous materials adhere on the wall surface of the reaction tube 111 as a sootlike product or a web-like product. Single-walled carbon nanotubes are contained much more in the web-like product. Sootlike products are considered to mainly comprise amorphous carbon. Taking it into consideration, in order to obtain products rich in single-walled carbon nanotubes and thereby increase the recovery percentage, efficient recovery of web-like products is important.

Japanese Patent Laid-Open Publication No. hei 8-12310 discloses a method of efficiently recovering web-like products containing soot generated by arc discharge. This method obtains single-walled carbon nanotubes of high purity to an extent by recovering soot-contained web-like products from inner wall surfaces of a reaction tube and thereafter purifying the products by an acidic solution or thermal oxidation.

T. Sugai et al. in Jpn. J. Appl. Phys. Vol. 38 (1999) L477 and T. Sugai et al., in J. Chem. Phys. Vol. 112, (2000) 6000 report a method of obtaining a high recovery percentage of single-walled carbon nanotubes by arc discharge in an electric furnace. It is reported there that single-walled carbon nanotubes were evaluated by electronic microscopy or Raman spectroscopy and that more efficient recovery of single-walled carbon nanotubes than that by arc discharge in a reaction tube was confirmed.

In contrast, the methods of manufacturing carbonaceous materials disclosed by Japanese Patent Laid-Open Publications Nos. hei 6-157016 and hei 6-280116 do not include a process of purifying soot or other carbonaceous materials obtained, and samples obtained still contain a significant quantity of metal catalyst and amorphous carbon. Therefore, in order to increase the purity of single-walled carbon nanotubes, purification of obtained carbonaceous materials will be indispensable. Japanese Patent Laid-Open Publication No. hei 8-12310 certainly includes purification of obtained carbonaceous materials, but after removing them from the reaction tube and exposing them to the atmospheric air. Since metal catalyst is in form of fine particles, as soon as it is exposed to the atmospheric air, its surface is oxidized. Metal catalyst, once oxidized, is difficult to remove. Therefore, it has been difficult to obtain high-purity single-walled carbon nanotubes substantially free from catalyst.

SUMMARY OF THE INVENTION

The present invention provides improved methods and apparatuses for manufacturing carbonaceous materials, with which high-purity carbon-based materials, such as single-walled carbon nanotubes can be obtained efficiently.

In an embodiment, the present invention provides a carbonaceous material manufacturing method in which an anode made of a carbon-based material and a cathode made of a carbon-based material and opposed to the anode are placed to define an arc discharge portion between the anode and the cathode in a reaction tube defining a carbonaceous material generating chamber, the arc discharge portion producing arc to generate carbonaceous materials when a voltage is applied across the anode and the cathode while the arc discharge portion is exposed to an atmospheric gas, and the atmospheric gas being supplied to flow in a predetermined direction enabling the atmospheric gas to pass through the discharge portion in the reaction tube. The method includes recovering the generated carbonaceous materials in a carbonaceous material capturer located downstream of the arc discharge portion with respect to the flowing direction of the atmospheric gas while heating the carbonaceous material capturer.

The atmospheric gas, in an embodiment, is preferably a catalytic gas.

The anode, in an embodiment, is preferably made of a carbon-family or carbon-based material not containing a catalyst.

Alternatively, the atmospheric gas, in an embodiment, is preferably a mixture gas of an organic gas and a catalytic gas.

Alternatively, the anode is, in an embodiment, preferably made of a carbon-family gas not containing a catalyst.

Alternatively, the atmospheric gas, in an embodiment, is preferably an organic gas.

The heating of the carbonaceous material capturer is preferably carried out under a reduced pressure in an embodiment.

The art discharge and the heating of the carbonaceous material capturer are preferably carried out simultaneously.

During the arc discharge, the atmospheric gas preferably makes a helical flow traveling around the arc discharge portion along the line connecting the anode and the cathode.

Preferably, different kinds or types of atmospheric gases are independently supplied into the reaction tube and mixed therein to make a helical flow of the mixed gas.

The invention further provides a carbonaceous material manufacturing apparatus. The apparatus includes:

a reaction tube defining a carbonaceous material generating chamber;

an anode made of a carbonaceous material and placed in the reaction tube;

a cathode made of a carbonaceous material and opposed to the anode to define an arc discharge portion between the anode and the cathode in the reaction tube; and a current supply portion connected to the anode and the cathode to induce arc discharge between the anode and the cathode, wherein an atmospheric gas supply portion is connected in communication with the reaction tube to supply the atmospheric gas to flow in a predetermined direction toward the arc discharge portion, wherein a carbonaceous material capturer is located downstream of the arc discharge portion in the reaction tube with respect to the flowing direction of the atmospheric gas, and wherein the apparatus includes a heater located inside or outside the carbonaceous material capturer to heat the carbonaceous material capturer.

The reaction tube, in an embodiment, preferably has an inner diameter small enough to limit the flow of the atmospheric gas to one direction and prevent its convection in the reaction tube.

The atmospheric gas, in an embodiment, is preferably a mixture gas of an organic gas and a catalytic gas.

The anode, in an embodiment, is preferably made of a carbon-family material not containing catalyst.

Alternatively, the atmospheric gas, in an embodiment, is preferably a catalytic gas.

The anode, in an embodiment, is preferably made of a carbon-family material not containing a catalyst.

Alternatively, the atmospheric gas, in an embodiment, is preferably an organic gas.

Preferably, the reaction tube, in an embodiment, is approximately elliptic in cross section; the atmospheric gas supply portion has a gas supply tube connected to the reaction tube to supply gas toward the arc discharge portion from an upstream position thereof to ensure carbonaceous materials generated by arc discharge in the arc discharge portion to be transported toward the capturer; and the gas supply tube extends in an approximately tangential direction of the reaction tube to generate a helical flow in the reaction tube.

The gas supply tube preferably includes, in an embodiment, at least two tubes, i.e. a first tube connected in communication in an approximately tangential direction of the reaction tube to supply first gas into the reaction tube, and a second tube connected in communication at a location different from that of the first tube in an approximately tangential direction of the reaction tube to supply second gas into the reaction tube.

Preferably, a first flowmeter for permitting the first gas to flow in the first tube at a first velocity is connected to the first tube, and a second flowmeter for permitting the second gas to flow in the second tube at a second velocity different from the fist velocity is connected to the second tube, in an embodiment.

The first gas is preferably an organic gas in an embodiment.

The second gas is preferably a catalytic gas in an embodiment.

Preferably, the gas supply tube extends with an acute angle from the arc discharge portion toward the capturer and is connected to the reaction tube in an embodiment.

Preferably, an inner tube smaller in diameter than the reaction tube is coaxially disposed in the reaction tube to reside at least at the position where the gas supply tube is connected in an embodiment.

The reaction tube preferably has a thinner portion around the arc discharge portion, which has an inner circumferential cross-sectional area larger than the inner circumferential cross-sectional area of the remainder portion of the reaction tube in an embodiment.

Preferably, the thinner portion extends up to slightly before the capturer, and the reaction tube is enlarged in its diameter immediately before the capturer in an embodiment.

Additional features and advantages of the present invention are described in, and will be apparent from, the following Detailed Description of the Invention and the figures.

DETAILED DESCRIPTION OF THE INVENTION

The present invention generally relates to methods and apparatuses for manufacturing carbonaceous materials. The methods and apparatuses of the present invention can effectively provide high-purity carbon-based materials, such as single-walled carbon nanotubes.

A carbonaceous material manufacturing method and a manufacturing apparatus therefor according to an embodiment of the invention will be explained with reference to FIGS. 2 through 4.

The carbonaceous material manufacturing apparatus 1 mainly manufactures single-walled carbon nanotubes. As shown in FIG. 2, the carbonaceous material manufacturing apparatus includes an approximately cylindrical reaction tube 11 and a current supply portion 12. The reaction tube 11 includes two portions, namely, an approximately cylindrical left reaction tube 11A and a right reaction tube 11B. Therefore, the reaction tube 11 can be separated to the left reaction tube 11A and the right reaction tube 11B such that single-walled carbon nanotubes can be taken out from a capturer 23, explained later. The reaction tube is made of quartz excellent in heat resistance and having a stable chemical nature.

Rodlike anode 13 and cathode 14 are provided inside the left reaction tube 11A. The anode 13 and the cathode 14 are made of pure carbon. Diameters of the anode 13 and the cathode 14 are 10 mm and 15 mm, respectively. The anode 13 and the cathode 14 lie on a common line, and one end 13A of the anode 13 and one end 14A of the cathode 14 are opposed via a slight gap. The other end 13A of the anode 13 is electrically connected to the positive pole of the current supply portion 12, and the other end 14B of the cathode 14 is electrically connected to the negative pole of the current supply portion 12, such that arc discharge can be brought about between one end 13A of the anode 13 and one end 14A of the cathode 14 when a current is supplied to the anode 13 and the cathode 14. A changeover switch, not shown, can revert the polarities of the electrodes and can bring about arc discharge by reverting positions of the anode 13 and the cathode 14. Opposed distal ends of the anode 13 and the cathode 14 define the arc discharge portion. The arc discharge portion is positioned approximately at the axial center of the left reaction tube 11A.

The anode 13 wears off because it is used as the source material of carbonaceous materials when carbonaceous materials such as single-walled carbon nanotubes are manufactured. The gap between the anode 13 and the cathode 14 is maintained always constant to prevent that arc discharge does not occur by enlargement of the gap between the anode 13 and the cathode 14 due to the wear of the anode 13. More specifically, the other and of the anode 13 is supported by a linear motion introducing mechanism 16 and can be moved in the lengthwise direction of the anode 13. The other end 14B of the cathode 14 is supported by a support member 15 that holds the cathode 14 immovable.

Opposite ends of the reaction tube 11 are covered by caps 11C, 11D, and the interior of the reaction tube 11 is shut off from the atmospheric air. Since the opposite ends of the reaction tube are round, the caps 11C, 11D covering them are round also. A supply tube 17 for supplying gas into the reaction tube 11 merges into the reaction tube 11 at a position slightly nearer to the arc discharge portion from the cap 11C, and the interior of the supply tube 17 communicates with the interior of the reaction tube 11.

Figure 3:
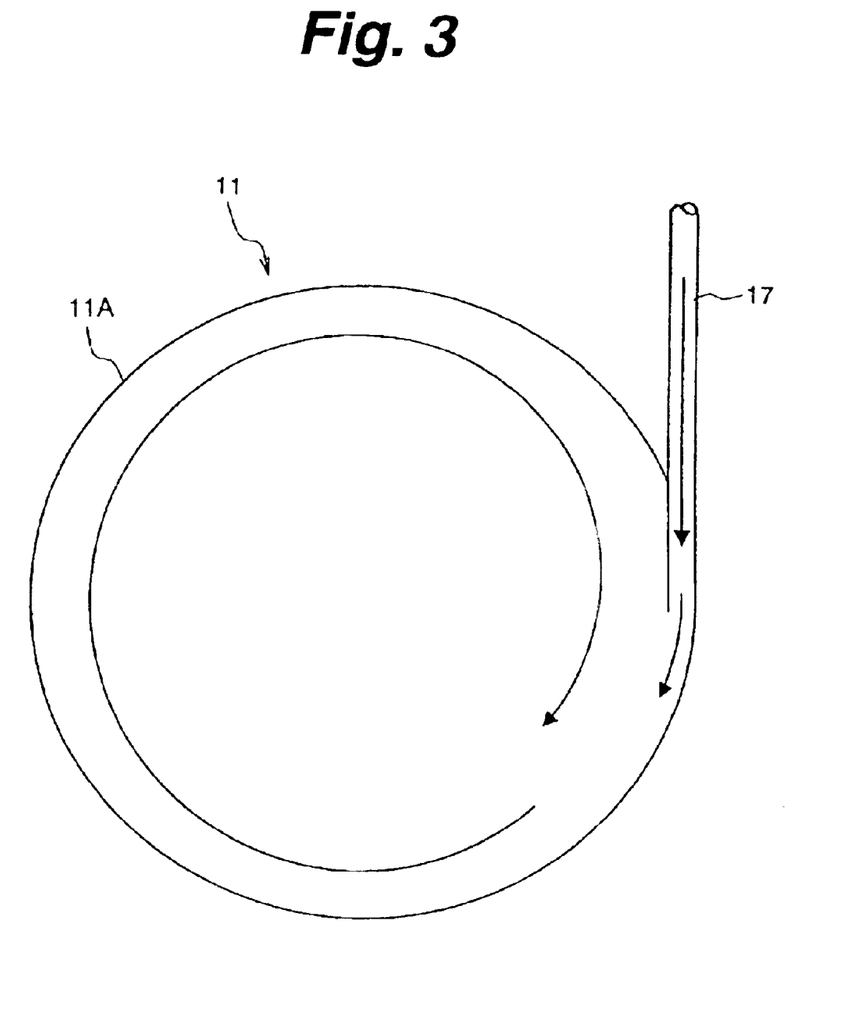
FIG. 3 is a schematic diagram showing a part of a reaction tube of the carbonaceous material manufacturing apparatus according to the embodiment of the invention, where a supply tube resides.

As shown in FIG. 3, the supply tube 17 is configured to extend tangentially of the peripheral surface of the left reaction tube 11A. Therefore, the gas supplied to the left reaction tube 11A rushes tangentially from the reaction tube 11. As a result, the supplied gas makes a helical flow in the reaction tube 11 as shown by arrows in FIG. 3, and it is supplied to the arc discharge portion in form of the helical flow.

Figure 2:
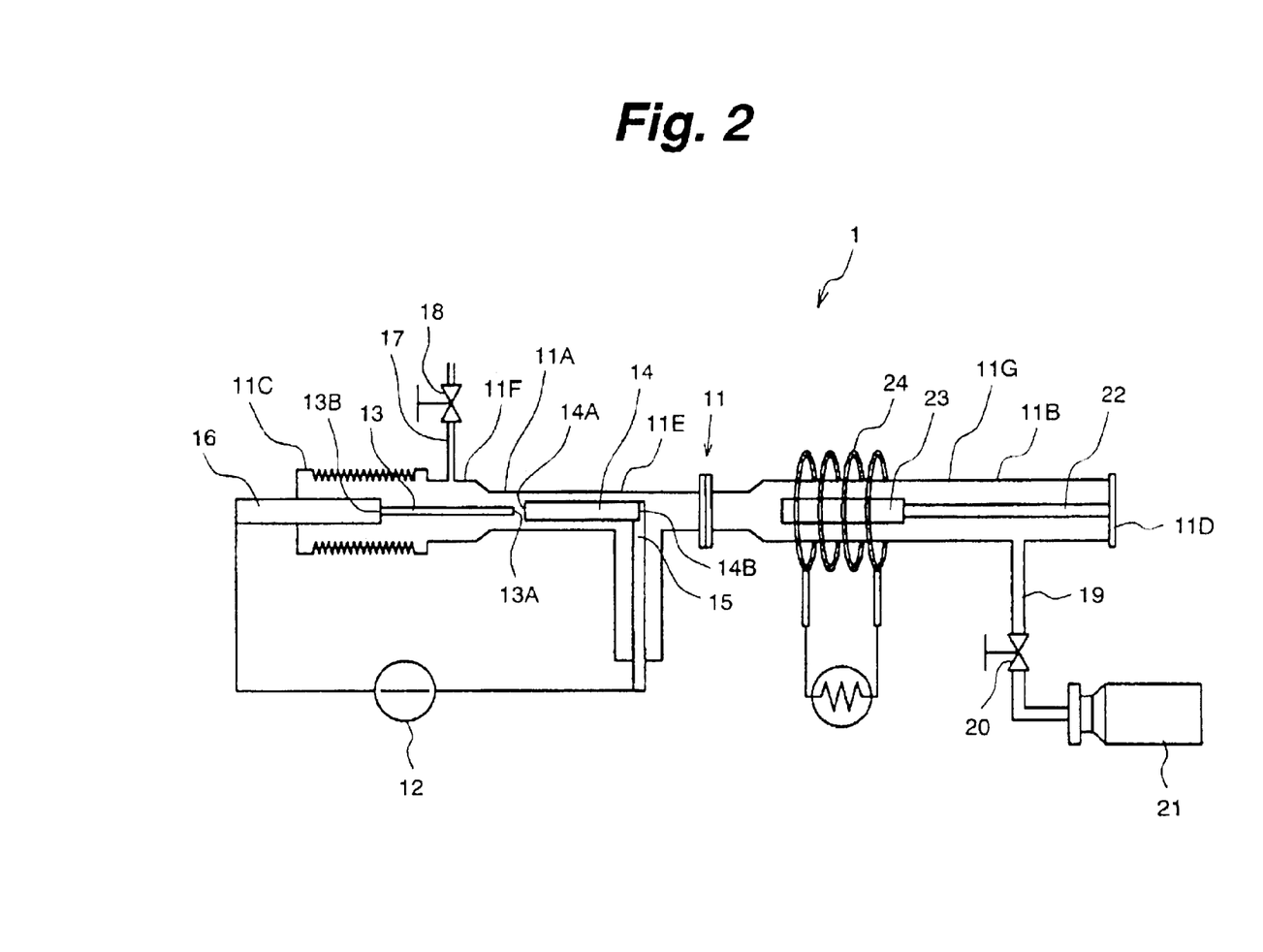
FIG. 2 is a schematic diagram showing a carbonaceous material manufacturing apparatus according to an embodiment of the invention.

The supply tube 17 includes a supply tube flowmeter 18 inserted in a part thereof as a flow control means (FIG. 2). At the other end of the supply tube 17 opposite from one end thereof connected to the reaction tube 11, a gas supply portion, not shown, is provided. The gas supply portion can selectively supply inactive gas or mixed gas of catalytic gas and organic gas. In an embodiment, the catalytic gas includes sublimed ferrocene. In an embodiment, the inactive gas includes helium gas. In addition to the carbon of the anode, the organic gas is another source material of single-walled carbon nanotubes and other carbonaceous materials to be produced, and here is used methane gas as a simple substance. The supply tube flowmeter 18 can adjust the flow rate of the mixed gas flowing through the supply tube 17 and supplied to the reaction tube 11. The maximum flow rate of the gas in the reaction tube 11 is 5 L/min.

Since the organic gas as the source material of carbonaceous materials to be generated is supplied to the arc discharge portion in the left reaction tube 11A, it reduces the percentage of the anode used as the source material of carbonaceous materials, and can greatly slow down the consumption of the anode. Additionally, since the catalytic gas is supplied to the arc discharge portion in the reaction tube 11, the anode need not be prepared by mixing catalyst and carbon. This contributes to reducing the time and cost for manufacturing anodes, and single-walled carbon nanotubes and other carbonaceous materials can be manufactured easily at a lower cost.

Furthermore, since the gas is supplied to the arc discharge portion while maintaining the helical flow, the catalytic gas and the organic gas are uniformly supplied to the arc discharge portion. Therefore, uniform discharge is ensured, and carbonaceous materials with a stable quality can be generated.

At a part of the right reaction tube 11B slightly nearer toward the arc discharge portion from the cap 11D, a discharge tube 19 is provided to discharge gas from the reaction tube. The interior of the discharge tube 19 is in communication with the interior of the reaction tube 11. The discharge tube 19 includes a discharge tube flowmeter 20 inserted in a part thereof. A pump 21 is provided at the other end of the discharge tube 19 opposite from one end thereof connected to the reaction tube 11. The pump 21 can discharge gas from inside the reaction tube 11 by sucking the gas by means of a reduced pressure. The discharge tube flowmeter 20 can adjust the sucking force of the pump 21.

The round cap 11D has a rodlike capturer support member 22 extending from the center thereof in the axial direction of the reaction tube 11 toward the arc discharge portion. At the other end of the capturer support member 22 opposite from one end thereof adjacent the cap 11D, a capturer 23 for capturing single-walled carbon nanotubes and other carbonaceous materials generated in the arc discharge portion is provided. The capturer 23 is a terete graphite rod, and one of its lengthwise ends is connected to the capturer support member 22. The capturer 23 extends over the length approximately from the axial center of the right reaction tube 11B to a predetermined position nearer to the arc discharge portion. With respect to the gas flow supplied from the supply tube 17, the predetermined position is downstream of the arc discharge portion. In contrast, the position of the supply tube 17 is upstream of the arc discharge portion. The carbonaceous materials generated in the arc discharge portion include weblike samples, amorphous carbon, graphite and catalyst by densities increasing in this order. Remarking the difference in density and adjusting the gas flow rate to an appropriate value, the embodiment is configured to selectively capture only weblike samples in the capturer 23 located downstream. Upon taking out single-walled carbon nanotubes captured by the capturer 23, the left reaction tube 11A and the right reaction tube 11B can be separated.

For the purpose of heating carbonaceous materials captured by the capturer 23 inside the right reaction tube 11B, a RF heater 24 is provided to surround the outer periphery of a part of the right reaction tube 11B where the capturer 23 is located. Since the RF heater 24 can heat the captured carbonaceous materials still held in the capturer 23, the carbonaceous materials obtained can undergo purification without being exposed to the atmospheric air. Therefore, it is possible to remove impurities such as Fe contained in the catalyst without oxidizing them. Simultaneously, it is possible to rearrange any single-walled carbon nanotubes inferior in crystalline property to those of a satisfactory crystalline property. Thereby, the percentage of single-walled carbon nanotubes in the carbonaceous materials can be increased efficiently.

Figure 4:
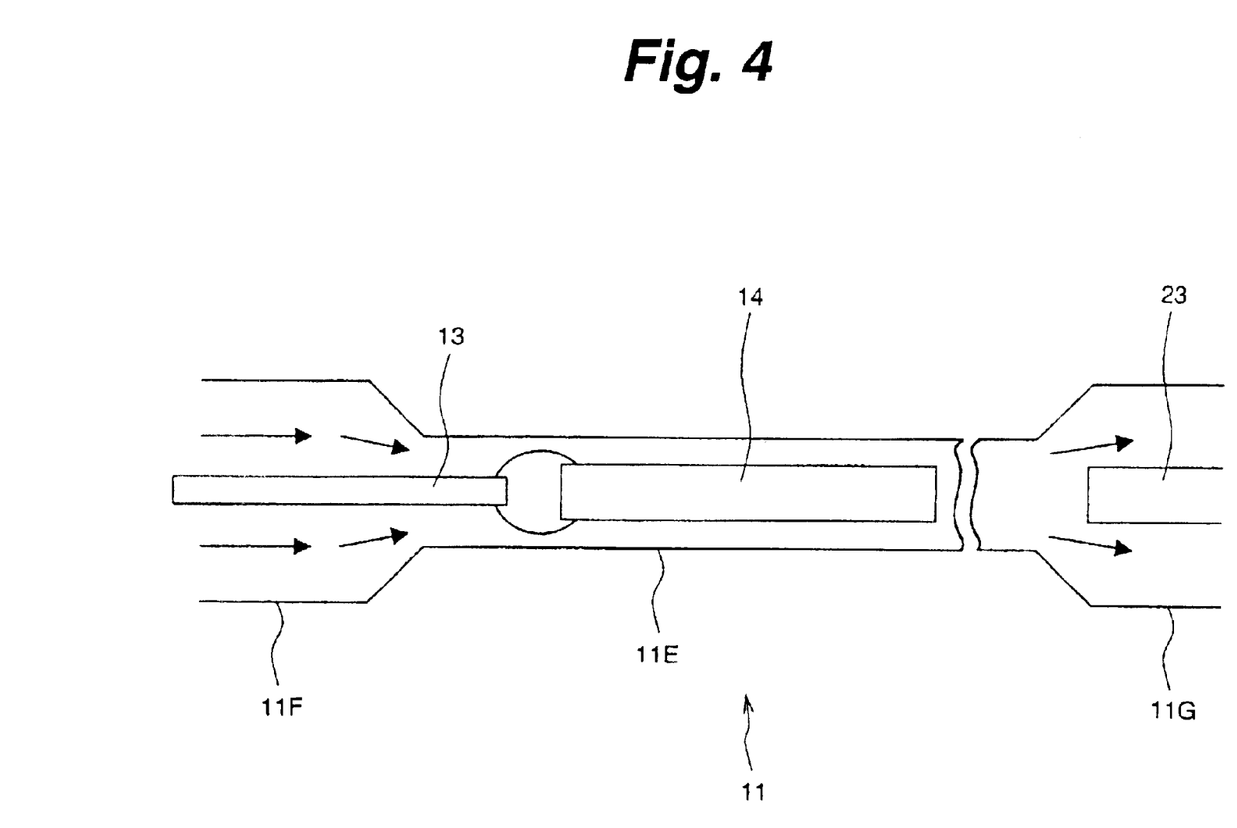
FIG. 4 is a schematic diagram showing a thinner portion of the reaction tube of the carbonaceous material manufacturing apparatus according to the embodiment of the invention.

As shown in FIGS. 2 and 4, the reaction tube 11 is not uniform in diameter over its full length, but it has a thinner portion 11E with a smaller diameter in a part thereof. More specifically, a part of the reaction tube 11 from the left end to a position beyond the location of the supply tube 17 toward the arc discharge portion extends with a uniformly larger diameter to form a thicker portion 11F, but the reaction tube 11 is reduced in diameter from this position to form the thinner portion 11E that extends beyond the arc discharge portion up to a position slightly before the location of the capturer 23 downstream in the gas flow direction. The thinner portion 11E is uniform in diameter within its own entire length. The reaction tube 11 again increases its diameter from the location just before the capturer 23 to form a thicker portion 11G with the same diameter as that of the left end portion of the reaction tube 11, and extends beyond the location of the discharge tube 19 to the right end of the reaction tube 11. This thicker portion 11G is uniform in diameter as well throughout its own full length. Diameter of the thinner portion 11E is 30 mm whereas diameter of the thicker portions 11F and 11G is 50 mm. As such, diameters of the thicker portions 11F, 11G and the thinner portion 11E are small enough to prevent convection of the atmospheric gas in the reaction tube.

Since the part of the reaction tube in the location of the arc discharge portion is the thinner portion 11E with the smaller diameter, and the cross-sectional area of the thinner portion 11E is smaller than the cross-sectional area of the thicker portion 11F in the location of the supply tube 17. Therefore, it is possible to efficiently converge the organic gas as the source material gas to the arc discharge portion as shown by arrows in FIG. 4 to ensure stable supply of the source material gas. As a result, the embodiment can prevent undesirable dilution of the organic gas in the arc discharge portion, and thereby ensures stable discharge and stable generation of carbonaceous materials.

Additionally, since the thinner portion 11E extends beyond the arc discharge portion up to immediately before the capturer 23, it can increase the gas flow in the reaction tube 11. Thus the reaction tube 11 can minimize undesirable adhesion of the generated carbonaceous materials on the inner circumferential surface of the span of the reaction tube 11 between the arc discharge portion and the capturer 23, and the capturer 23 can efficiently capture the carbonaceous materials.

Moreover, since the thicker portion 11G begins at the position just before the capturer 23 and can slow down the velocity of the gas that flows around the capturer 23, the embodiment can minimize carbonaceous materials that pass through the capturer 23 without being captured thereby.

In an embodiment, the present invention provides a manufacturing method of carbonaceous materials such as single-walled carbon nanotubes. Before the manufacture of carbonaceous materials, the anode 13 is prepared. That is, carbon lumps are cut into the forms of the anode 13 and the cathode 14.

After that, the anode 13 and the cathode 14 are set in the linear motion introducing mechanism 16 and on the support member 15, respectively, and the reaction tube 11 is once evacuated to $10^{-1}$ Pa or even lower. Thereafter, inactive gas is supplied from the gas supply portion, not shown, via the supply tube into the reaction tube 11 until the pressure therein reaches approximately 66.7 kPa (500 Torr). Then the supply of the inactive gas is stopped and arc discharge is brought about in the arc discharge portion. Concurrently, mixed gas containing catalytic gas and organic gas is supplied from the gas supply portion, not shown, and the pump 21 is simultaneously activated to discharge the gas from the reaction tube 11 and thereby make a flow of the gas in the reaction tube 11. Percentage of the catalytic gas in the mixed gas is 50 wt %. In this process, a pressure around 66.7 kPa is maintained in the reaction tube 11, and the duration of time of the arc discharge is 30 minutes. In this period, since the gas is supplied from the supply tube 17 in the tangential direction along the inner circumferential surface of the left reaction tube 11A, it makes a helical flow especially in the location of the arc discharge portion in the reaction tube 11. Additionally, since the part of the reaction tube in the location of the arc discharge portion is the thinner portion 11E with the smaller diameter, the mixed gas of the organic gas as the source material gas and the catalytic gas is efficiently converged to the arc discharge portion. In this state, carbonaceous materials including single-walled carbon nanotubes and others are generated in the arc discharge portion, and transported to the capturer 23 by the flow of the mixed gas of the organic gas and the catalytic gas.

After the arc discharge is completed, the reaction tube 11 is evacuated to $10^{-1}$ Pa or even lower, and in this sate, the RF heater 24 carbonaceous materials captured by the capturer 23 are heated by. The heating is conducted at the temperature of 1100° C. for 30 minutes. Through the foregoing steps, high-purity single-walled carbon nanotubes are manufactured with a high efficiency.

An experiment was carried out on manufacturing methods and apparatuses of carbonaceous materials according to an embodiment of the present invention by comparing Inventions 1 through 6 that are carbonaceous materials prepared by manufacturing methods and apparatuses of carbonaceous materials according to an embodiment of the present invention with comparative examples that are carbonaceous materials manufactured by comparative examples. A discussion of the experiments is provided below to illustrate without limitation the present invention.

Invention 1 was prepared under substantially the same condition of the manufacturing method and the manufacturing apparatus of carbonaceous materials according to an embodiment of the present invention. The diameter of the anode was 6 mm and the anode was a composite rod made of metal powder and carbon with a composition of Ni=4.2%, Y=1.0% and C=94.8%. Additionally, before inducing arc discharge, the chamber was once evacuated to $10^{-1}$ Pa or lower, and He gas was thereafter introduced until making air pressure of 66.7 kPa in the reaction tube 1. While maintaining this air pressure, He gas was made to flow in the reaction tube 11 at the flow rate of 5 L per minute. Under this condition, direct current of 150 A was supplied between the anode 13 and the cathode 14 thereby to generate arc for two minutes. A distance between the electrodes was kept to adjust the potential difference between the electrodes to 45~50 V.

After the arc discharge was completed, the interior pressure of the chamber was held in $10^{-1}$ Pa or lower, the capturer 23 was heated to and kept at 1100° C. for 30 minutes with high-frequency waves from the RF heater 24.

Invention 2 was prepared under the same conditions as those used to prepare Invention 1 except that the flow rate of He gas flowing in the reaction tube 11 was controlled to 0.5 L per minutes. Invention 3 was prepared under the same conditions as those used to prepare Invention 1 except that direct current of 200 A was applied between the electrodes. Invention 4 was prepared under the same conditions as those used to prepare Invention 1 except that, even after completing the arc discharge, the He gas pressure of 66.7 kPa was maintained in the reaction tube without evacuating the reaction tube, and under the pressure, the capturer 23 was heated to and held at 1100° C. for thirty minutes with high-frequency waves from the RF heater 24.

Invention 5 was prepared under the same conditions as those used to prepare Invention 1 except that the anode was a composite rod made of metal powder and carbon to have the composition of Co=1.2%, Ni=1.2% and C=97.6%. Invention 6 was prepared under the same conditions used to prepare Invention 1 except that the anode was a composite rod made of metal powder and carbon to have the composition of Co=1.2%, Ni=1.2% and C=97.6% and that, even after completing the arc discharge, the He gas pressure of 66.7 kPa was maintained in the reaction tube without evacuating the reaction tube, and under the pressure, the capturer 23 was heated to and held at 1100° C. for thirty minutes with high-frequency waves from the RF heater 24.

Comparative Example 1 was prepared under the same conditions as those used to prepare Invention 1 except that the carbonaceous materials accumulating on the capturer 23 were recovered without the heating process. Comparative Example 2 was prepared under the same conditions as those used to prepare Invention 1 except that the anode was a composite rod made of metal powder and carbon to have the composition of Co=1.2%, Ni=1.2% and C=97.6% and that the carbonaceous materials accumulating on the capturer 23 were recovered without the heating process.

Since Inventions 1 through 4 are different from Inventions 5, 6 and Comparative Example 2 in composition of the anode of the carbonaceous material manufacturing apparatus, Inventions 1 through 4 are compared with Comparative Example 1 whereas Inventions 5 and 6 are compared with Comparative Example 2. Carbonaceous materials obtained in Inventions 1 to 6 and Comparative Examples 1, 2 were evaluated with a thermogravimetric device. For this thermogravimetric analysis (TGA), Pyris 1 TGA manufactured by PerkinElmer, Inc. was used. Each sample to be analyzed was set in an alumina pan, and while dry air was supplied at the flow rate of 30 ml. per minute, the sample was heated to 105° C. by the heating rate of 5° C. per minute. Then the sample was maintained at the temperature to thereby remove moisture therefrom. Consecutively, the sample was heated to 900° C. by the heating rate of 5° C. per minute. Using the weight of the sample after being maintained at 105° C. for one hour as its reference weight, changes in weight of the sample while heated thereafter were evaluated. Although carbon in the carbonaceous materials is oxidized by the heating in the air, catalytic metals and metal oxides remain even after they are heated to 900° C. Therefore, the quantity of the residual after the heating indicates the quantity of catalytic metals and metal oxides contained in the carbonaceous materials obtained.

As a result of the experiment, quantity of the residual was 7.5 wt % in Invention 1, 6.4 wt % in Invention 2, 4.8 wt % in Invention 3, 20.1 wt % in Invention 4, and 30.2 wt % in Comparative Example 1. Further, it was 1.3 wt % in Invention 5, 5.0 wt % in Invention 6, and 11.2 wt % in Comparative Example 2. Both the comparison of Inventions 1 through 4 with Comparative Example 1 and the comparison of Inventions 5 and 6 with Comparative Example 2 show that the quantity of the residual is less in the Invention than in Comparative Example, and this demonstrates metals and metal oxides in the carbonaceous materials vaporize and fly in the process of heating the carbonaceous materials captured by the capturer 23. It is also noted from comparison of Inventions 1, 2 and 3 with Invention 4 or comparison between Inventions 5 and 6 that the quantity of the residual in Invention 4 is quite large in the former comparison and the quantity of the residual in Invention 6 is quite large in the latter comparison. From this fact, it is appreciated that the heating of carbonaceous materials captured by the capturer 23 under the evacuated condition promotes vaporization and flying of metals and metal oxides in the carbonaceous materials and they are removed more effectively.

Figure 5:
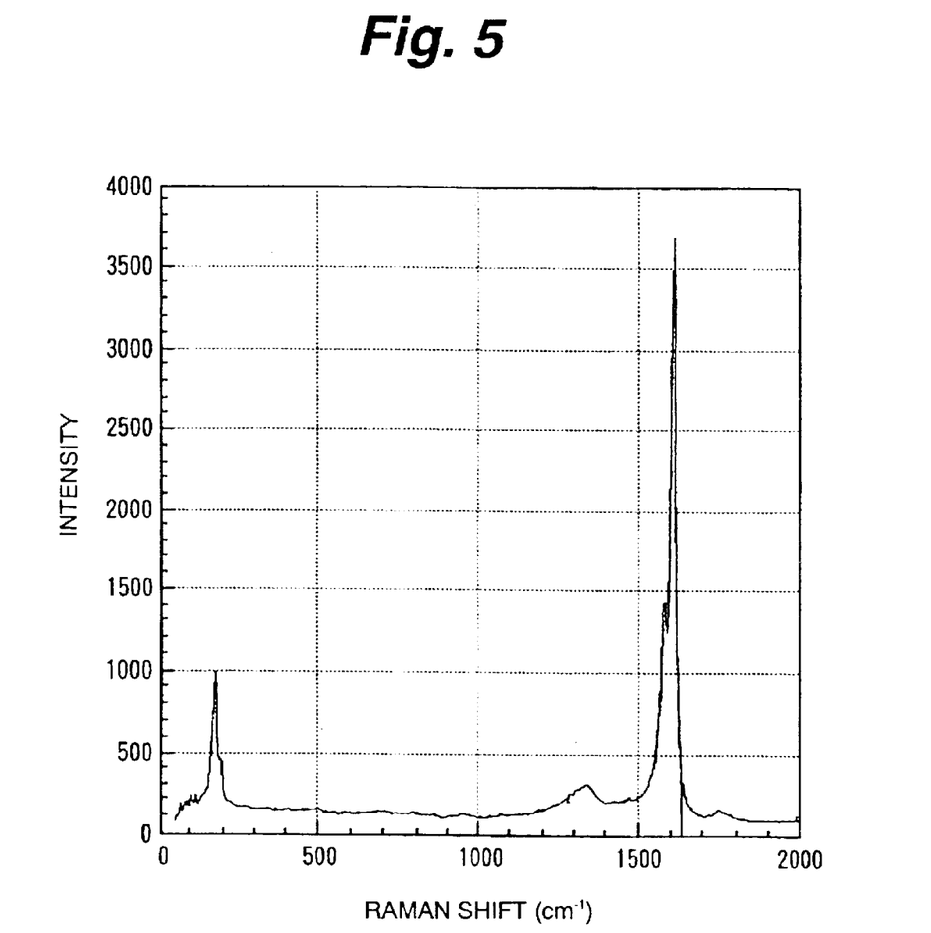
FIG. 5 is a graph showing the Raman spectrum of Invention 1.
Figure 6:
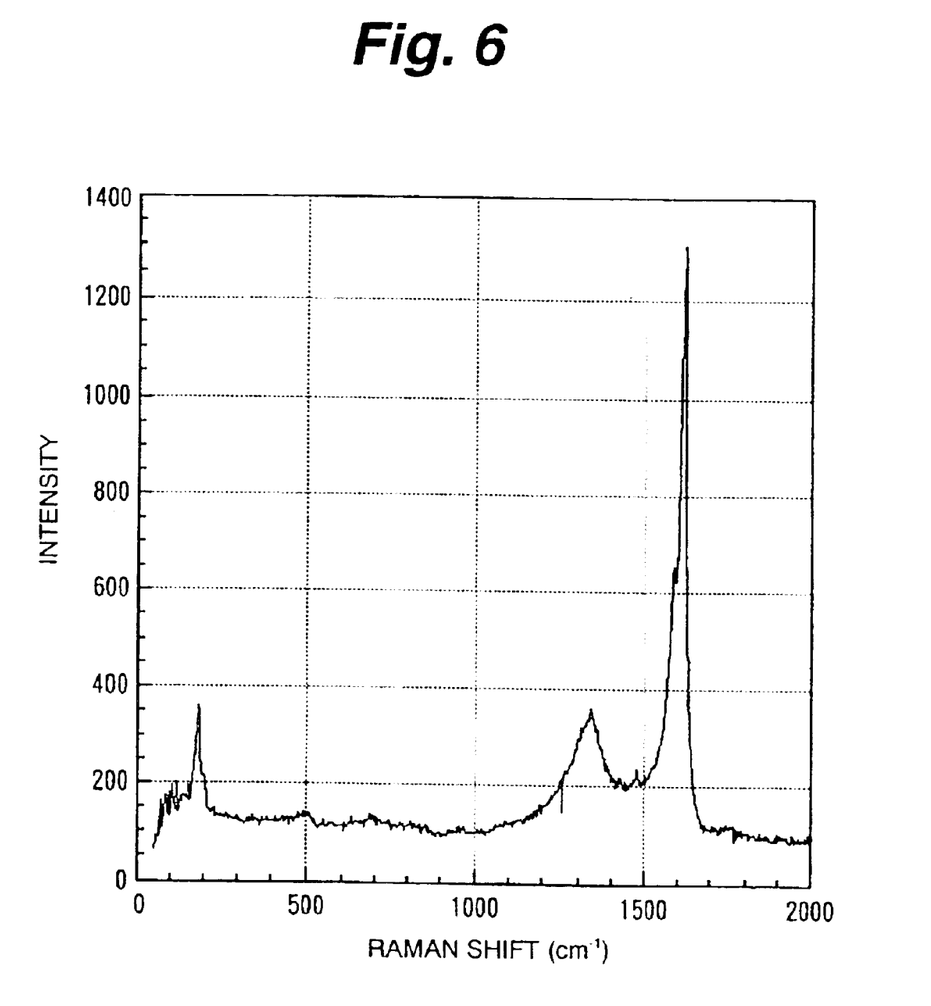
FIG. 6 is a graph showing the Raman spectrum of Comparative Example 1.

Raman spectroscopy was carried out with Invention 1 and Comparative Example 1. As a result, as shown in FIGS. 5 and 6, the peak of single-walled carbon nanotubes by the breathing mode appeared near 180 $cm^{-1}$ in both samples. Therefore, it was confirmed that single-walled carbon nanotubes are contained in the carbonaceous materials obtained in both Invention 1 and Comparative Example 1. However, from comparison between FIGS. 5 and 6, it is appreciated that the peak of single-walled nanotubes corresponding to the breathing mode appears more intensively in FIG. 5, and this demonstrates that growth of single-walled carbon nanotubes progressed in Invention 1 while the carbonaceous materials obtained were heated.

On the other hand, in both Invention 1 and Comparative Example 1, the D band by amorphous carbon as impurity appeared near 1350 $cm^{-1}$. As compared with FIG. 6, the peak corresponding to amorphous carbon, i.e. the D band, is smaller in FIG. 5. Therefore, it is appreciated that the heating of carbonaceous materials obtained in Invention 1 changed them from disordered crystalline orientation to regular crystal orientation.

The invention is not limited to the manufacturing method and manufacturing apparatus of carbonaceous materials according to the embodiment heretofore explained, but contemplates various changed and modifications within the scope recited in the claims. For instance, the foregoing embodiment uses the mixed gas of catalytic gas and organic gas. However, the mixed gas may be a mixture of inactive gas such as He, Ar, or the like, and catalytic gas, or a mixture of catalytic gas, organic gas and inactive gas.

Additionally, the foregoing embodiment uses sublimed ferrocene as the catalytic gas. However, in lieu of ferrocene, also usable is any other metallocene, such as nickelocene having Ni in lieu of Fe in ferrocene, cobaltocene (bis (cyclopentadienyl)cobalt) having Co in lieu of Fe, or the like. Alternatively, their mixture, like that of ferrocene and nickelocene, may be used as well.

The anode 13 and the cathode 14 have been explained as being made of pure carbon. However, in case the anode is prepared by using a material containing Fe, Ni, Co, and/or others, these catalysts need not be removed intentionally, but may be used directly.

The organic gas supplied to the reaction tube has been explained as being single-substance methane gas. However, it may be a single substance of an alkane-family gas such as methane, ethane or butane, or their mixture. These examples of organic gas are especially preferable, but instead, a single substance of organic gas of alkane family, alkene family, alkyne family, aromatic series, or the like, or their mixture, may be used.

As the inactive gas, argon gas, neon gas, or the like, may be used in lieu of helium gas.

Percentage of the catalytic gas in the mixed gas used in the foregoing embodiment is 50 wt %. However, its percentage may be any in the range of 4 to 50%.

The reaction tube 11 has been explained as being made of quartz. However, it may be made of SUS304, SUS316, tantalum, molybdenum, or the like, as well. That is, any material is acceptable provided it is weldable, high in heat resistance, chemically stable, and free from influences of high-frequency waves. Alternatively, only a part of the reaction tube 11 around the arc discharge portion may be made of such material.

An electric furnace or an infrared furnace may be provided in lieu of the RF heater 24 to heat carbonaceous materials including single-walled carbon nanotubes captured by the capturer 23.

Instead of carrying out the heating by the RF heater 24 after completing the arc discharge, the heating may be carried out concurrently with the arc discharge. In this case, single-walled carbon nanotubes and other carbonaceous materials can be manufacturer in a shorter time.

Although the foregoing embodiment adjusts the air pressure in the reaction tube 11 to 66.7 kPa (500 Torr) during the arc discharge, the pressure may be controlled within the range of 13.3 to 333.3 kPa (100 to 2500 Torr) approximately.

Figure 7:
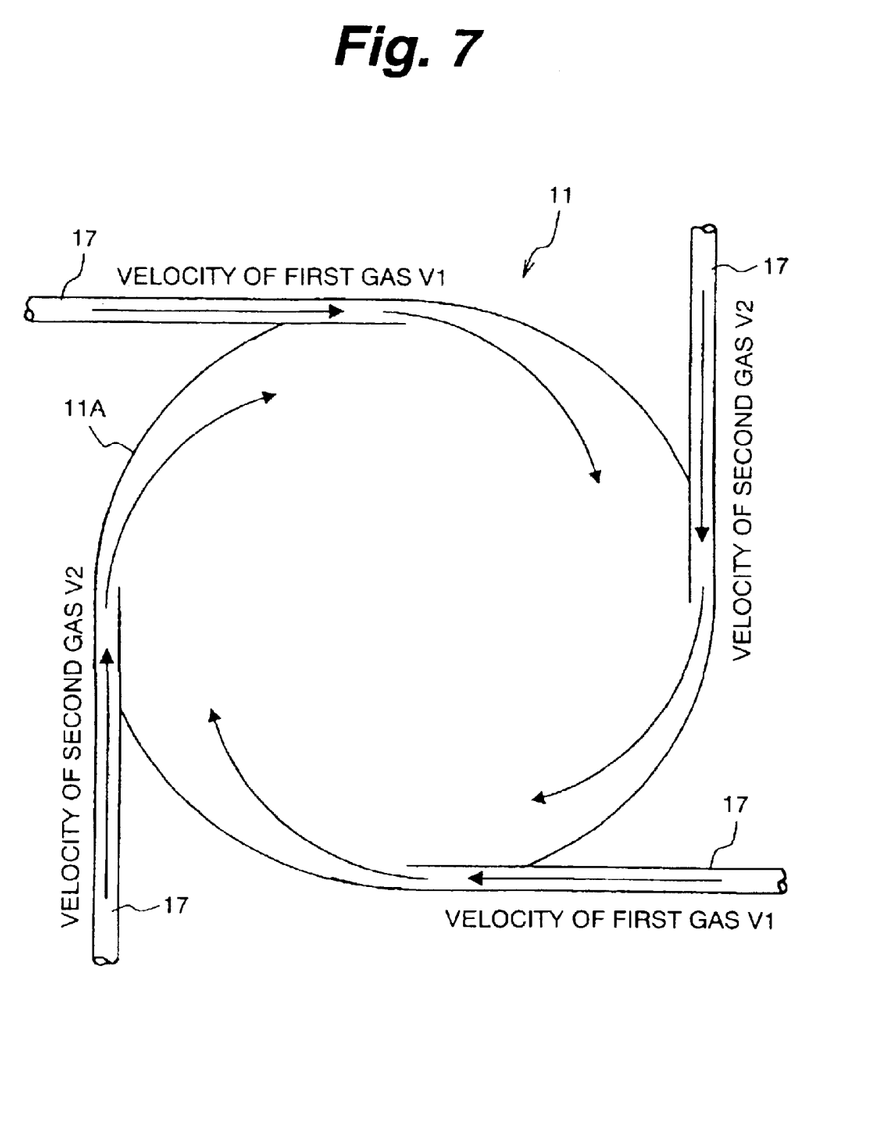
FIG. 7 is a schematic diagram showing a part of a reaction tube in an embodiment of the present invention, where the supply tube resides.

The foregoing embodiment uses only one supply tube 17 for supplying gases to the reaction tube 11. However, a plurality of supply tubes may be provided in tangential directions as shown in FIG. 7. Here again, the supply tubes should be located upstream of the arc discharge portion with respect to the gas flow direction. Additionally, different kinds of gases may be supplied independently from different supply tubes into the reaction tube such that they are mixed in the reaction tube. If flowmeters are individually provided in those supply tubes to individually determine velocities of gases supplied from the respective supply tubes such as velocity v1 and velocity v2, respectively, the helical flow of the mixed gas generated in the reaction tube can be powered, and it will be possible to supply a first gas from a first tube and a second gas from a second tube, for example. Therefore, mixture of different gases can be controlled easily, and simultaneously, the process of mixing the first gas and the second gas before introducing them into the reaction tube can be omitted. Furthermore, the first gas and the second gas mix more easily and more uniformly.

The supply tube 17 used in the foregoing embodiment for supplying gases is configured to extend in the tangential direction with respect to the peripheral surface of the reaction tube 17. In addition to this, the reaction tube 17 may extend at an acute angle relative to the direction from the arc discharge portion toward the capturer and is thereafter connected to the reaction tube. In this case, the helical flow of the mixed gas generated in the reaction tube can be increased in velocity of its part toward the downstream.

For the purpose of generating a more desirable helical flow of the mixed gas, an inner tube smaller in diameter than the reaction tube may be coaxially located in the reaction tube to extend at least over the location of the supply tube.

The thinner portion 11E of the reaction tube 11 has been explained as spanning from the location of the arc discharge portion up to slightly before the capturer 2. However, the thinner portion may be limited merely to the location of the arc discharge portion.

Although the foregoing embodiment configures the part of the reaction tube 11 surrounding the capturer 23 to be the thicker portion 11G, this portion may be thinned as well such that the thinner portion 11E extend over the entire length of the right reaction tube 11B.

Although the foregoing embodiment has been explained as heating the carbonaceous materials captured by the capturer 23 under a vacuum, it may be conducted under a reduced pressure, or under a condition other than the vacuum or the reduced pressure.

Near the arc discharge portion, the reaction tube 11 may have a window for checking the arc discharge condition.

The supply tube 17 for supplying gases has been explained as extending in the tangential direction of the peripheral surface of the reaction tube 17. However, it may extend in any other direction.

Although the reaction tube 11 has been explained as including the thinner portion 11E, it may be configured to have no thinner portion.

The foregoing embodiment has been explained as supplying the mixed gas of catalytic gas and organic gas to the arc discharge portion. However, inactive gas alone may be supplied instead of the mixed gas. In this case, however, the anode must be a carbon electrode containing catalyst similarly to the anode 113 of the conventional carbonaceous material manufacturing apparatus.

According to the carbonaceous material manufacturing method in an embodiment, since the atmospheric gas is supplied to flow in a predetermined direction such that it can pass through the arc discharge portion, carbonaceous materials generated in the arc discharge portion are transported in a predetermined direction without adhering to any wall surface in the reaction tube, and can be reliably captured by the carbonaceous material capturer located downstream of the arc discharge portion. Further, since the carbonaceous material capturer is heated, carbonaceous materials adhering on the capturer are heated, and growth of single-walled carbon nanotubes is promoted such that single-walled carbon nanotubes inferior in crystalline property are rearranged to single-walled carbon nanotubes with a favorable crystalline property. Thereby, percentage of single-walled carbon nanotubes in the carbonaceous materials can be increased efficiently.

According to the carbonaceous material manufacturing method recited in an embodiment using catalytic gas as the atmospheric gas, the anode can be prepared without adding catalyst to it. Therefore, upon preparing the anode, the method can significantly reduce the work for mixing crushed carbon and powdered catalyst, then molding the mixture, and next sintering and machining the molded piece, and the preparation of the anode is simplified.

According to the carbonaceous material manufacturing methods in an embodiment in which the anode is made of a carbon-family material not containing catalyst, the anode can be prepared solely from a carbonaceous material not containing catalyst as a graphite rod, for example.

According to the carbonaceous material manufacturing method in an embodiment in which the atmospheric gas is a mixture of organic gas and catalytic gas, consumption of carbon by arc discharge is compensated by the organic gas. Therefore, consumption of the anode is slowed down, and the anode can be used for arc discharge over a longer period. Additionally, the anode can be prepared without adding catalyst to it.

According to the carbonaceous material manufacturing method in embodiment using organic gas as the atmospheric gas, consumption of carbon by arc discharge is compensated by the organic gas. Therefore, consumption of the anode is slowed down, and the anode can be used for arc discharge over a longer period.

According to the carbonaceous material manufacturing method in an embodiment, which heats the carbonaceous material capturer under a reduced pressure, the carbonaceous materials obtained can be purified without being exposed to the atmospheric air. Therefore, sublimation speed of the catalyst in the carbonaceous materials accumulating on the capturer can be increased, and carbonaceous materials can be recovered more efficiently by removing catalyst and/or other impurities without oxidization thereof.

According to the carbonaceous material manufacturing method in an embodiment proceeding generation and recovery of carbonaceous materials in parallel, the manufacture of carbonaceous materials is speeded up.

According to the carbonaceous material manufacturing method in an embodiment, which supplies the atmospheric gas in a helical flow moving in the direction along a line connecting to the anode and the cathode around the arc discharge portion during arc discharge, uniform supply of the gas to the arc discharge portion is ensured, and carbonaceous materials generated in the arc discharge portion can be transported efficiently to the capturer.

According to the carbonaceous material manufacturing method in an embodiment, configured to supply different kinds of atmospheric gases independently to the reaction tube so as to mix them in the reaction tube into the mixed gas while making its helical flow, the step of mixing different kinds of gases beforehand can be omitted.

According to the carbonaceous material manufacturing apparatus in an embodiment including the heater located inside or outside the carbonaceous material capturer to heat it, since the carbonaceous material capturer is heated, carbonaceous materials adhering to the capturer are heated as well. Therefore, single-walled carbon nanotubes inferior in crystalline property are rearranged to single-walled carbon nanotubes with a favorable crystalline property. Thereby, percentage of single-walled carbon nanotubes in the carbonaceous materials can be increased efficiently.

According to the carbonaceous material manufacturing apparatus in an embodiment, in which the reaction tube has a small inner diameter, it can limit the flow of the atmospheric gas to only one direction to prevent convection of the atmospheric gas in the reaction tube.

According to the carbonaceous material manufacturing apparatus in an embodiment, using the mixed gas of organic gas and catalytic gas as the atmospheric gas, consumption of carbon by arc discharge is compensated by the organic gas. Therefore, consumption of the anode is slowed down, and the anode can be used for arc discharge over a longer period. Additionally, the anode can be prepared without adding catalyst to it.

According to the carbonaceous material manufacturing apparatuses in an embodiment in which the anode is made of a carbon-family material not containing catalyst, the anode can be prepared solely from a carbonaceous material not containing catalyst as a graphite rod, for example.

According to the carbonaceous material manufacturing apparatus in an embodiment using catalytic gas as the atmospheric gas, the anode can be prepared without adding catalyst to it. Therefore, upon preparing the anode, the method can significantly reduce the work for mixing crushed carbon and powdered catalyst, then molding the mixture, and next sintering and machining the molded piece, and the preparation of the anode is simplified.

According to the carbonaceous material manufacturing apparatus in an embodiment using organic gas as the atmospheric gas, consumption of carbon by arc discharge is compensated by the organic gas. Therefore, consumption of the anode is slowed down, and the anode can be used for arc discharge over a longer period.

According to the carbonaceous material manufacturing apparatus in an embodiment in which the reaction tube has an approximately elliptic cross section and the gas supply tube extends approximately in a tangential direction of the reaction tube to generate a helical flow in the reaction tube, carbonaceous materials generated in the arc discharge portion can be transported efficiently to the capturer.

According to the carbonaceous material manufacturing apparatus in an embodiment in which at least the first tube and the second tube are provided as the gas supply tube means, the helical flow of the mixed gas generated in the reaction tube is powered. Additionally, since the first gas is supplied through the first tube and the second gas through the second tube, the control for mixing these gases is easier, and the process of mixing the first and second gases before introducing them into the reaction tube can be omitted.

According to the carbonaceous material manufacturing apparatus in an embodiment capable of setting the velocity of the first gas and the velocity of the second gas introduced into the reaction tube at different velocities, the first gas and the second gas can be mixed more easily in the helical flow generated in the reaction tube, and the mixture gas becomes more uniform in quality.

According to the carbonaceous material manufacturing apparatus in an embodiment using organic gas as the first gas, mixture of the organic gas with other gases is attained more easily.

According to the carbonaceous material manufacturing apparatus in an embodiment using catalytic gas as the second gas, mixture of the catalytic gas with other gases is attained more easily.

According to the carbonaceous material manufacturing apparatus in an embodiment in which the gas supply tub extends at an acute angle with respect to the direction from the arc discharge portion toward the capturer and is thereafter connected to the reaction tube, the helical flow of the mixed gas generated in the reaction tube can be increased in velocity of its part toward the downstream.

According to the carbonaceous material manufacturing apparatus in an embodiment additionally including the inner tube smaller in diameter than the reaction tube and coaxially located in the reaction tube to extend at least over the location of the supply tube, the helical flow can be shaped to be substantially uniform in diameter and can be powered.

According to the carbonaceous material manufacturing apparatus in an embodiment in which the reaction tube includes a thinner portion around the arc discharge portion to define an inner peripheral surface smaller in cross section than the remainder part of the reaction tube, the gas flow introduced into the reaction tube can be converged to the arc discharge portion to generate carbonaceous materials more efficiently. Additionally, carbonaceous materials generated are prohibited to fly everywhere in the reaction tube and are reliably guided in the predetermined direction to be recovered easily.

According to the carbonaceous material manufacturing apparatus in an embodiment, in which the thinner portion of the reaction tube extends up to slightly before the capturer, it is less likely to occur that carbonaceous materials generated in the arc discharge portion lose their mobility before reaching the capturer and adhere to the inner peripheral surface of the reaction tube. Additionally, since the reaction tube is enlarged in its diameter immediately before the capturer, carbonaceous materials generated slow down immediately before the capturer, and the capturer can recover them efficiently.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A carbonaceous material manufacturing method, the method comprising the steps of:
providing an apparatus including an anode composed of a carbonaceous material and a cathode composed of a carbonaceous material and opposed to the anode such that an arc discharge portion is defined between the anode and the cathode in a reaction tube defining a carbonaceous material generating chamber, wherein the arc discharge portion produces an arc to generate carbonaceous materials when a voltage is applied across the anode and the cathode while the arc discharge portion is exposed to an atmospheric gas, and the atmospheric gas is supplied to flow in a predetermined direction enabling the atmospheric gas to pass through the discharge portion in the reaction tube; and recovering the generated carbonaceous materials in a carbonaceous material capturer located downstream of the arc discharge portion with respect to the flowing direction of the atmospheric gas while heating the carbonaceous material capturer.

2. The method according to claim 1 wherein the atmospheric gas includes a catalytic gas.

3. The method according to claim 2 wherein the anode includes a carbonaceous material not containing a catalyst.

4. The method according to claim 1 wherein the atmospheric gas includes a mixture of an organic gas and a catalytic gas.

5. The method according to claim 4 wherein the anode includes a carbonaceous material not containing a catalyst.

6. The method according to claim 1 wherein the atmospheric gas includes an organic gas.

7. The method according to claim 1 wherein the carbonaceous material capturer is heated under a reduced pressure.

8. The method according to claim 1 wherein the steps of producing arc and heating of the carbonaceous material capturer are performed concurrently.

9. The method according to claim 1 wherein, during producing arc, the atmospheric gas is supplied allowing a helical flow that travels in a direction connecting the anode and the cathode around the arc discharge portion.

10. The method according to claim 9 wherein plurality of atmospheric gases are supplied to the reaction tube independently from each other and mixed in the reaction tube to make the helical flow of the mixed gases.

11. A carbonaceous material manufacturing apparatus comprising:

a reaction tube defining a carbonaceous material generating chamber;

an anode composed of a carbonaceous material and placed in the reaction tube;

a cathode composed of a carbonaceous material and opposed to the anode to define an arc discharge portion between the anode and the cathode in the reaction tube; and a current supply portion connected to the anode and the cathode to induce arc discharge between the anode and the cathode, wherein an atmospheric gas supply portion is connected in communication with the reaction tube to supply the atmospheric gas to flow in a predetermined direction toward the arc discharge portion, wherein a carbonaceous material capturer is located downstream of the arc discharge portion in the reaction tube with respect to the flowing direction of the atmospheric gas, and wherein a heater is located inside or outside the carbonaceous material capturer to heat the carbonaceous material capturer.

12. The apparatus according to claim 11 wherein the reaction tube has an inner diameter effective in size to limit the flow of the atmospheric gas in a direction and prevent convection of the atmospheric gas in the reaction tube.

13. The apparatus according to claim 11 wherein the atmospheric gas includes a mixture of an organic gas and a catalytic gas.

14. The apparatus according to claim 13 wherein the anode includes a carbonaceous material not containing a catalyst.

15. The apparatus according to claim 11 wherein the atmospheric gas includes a catalytic gas.

16. The apparatus according to claim 15 wherein the anode includes a carbonaceous material not containing a catalyst.

17. The apparatus according to claim 11 wherein the atmospheric gas includes organic gas.

18. The apparatus according to claim 11, wherein the reaction tube is approximately elliptic in cross section, wherein the atmospheric gas supply portion includes a gas supply tube connected to the reaction tube to supply gas from upstream of the arc discharge portion toward the arc discharge portion allowing transportation of carbonaceous materials generated by arc discharge in the arc discharge portion toward the carbonaceous material capturer, and wherein the gas supply tube extends in a tangential direction of the reaction tube to make a helical flow in the reaction tube.

19. The apparatus according to claim 18 wherein the gas supply tube includes at least two tubes including a first tube connected in communication with the reaction tube in a tangential direction thereof to supply a first gas into the reaction tube and a second tube connected in communication with the reaction tube in a location from that of the first tube in a tangential direction of the reaction tube to supply a second gas into the reaction tube.

20. The apparatus according to claim 19 wherein a first flowmeter is connected to the first tube to permit the first gas to flow at a first velocity in the first tube and a second flowmeter is connected to the second tube to permit the second gas to flow at a second velocity in the second tube.

21. The apparatus according to claim 19 wherein the first gas includes an organic gas.

22. The apparatus according to claim 19 wherein the second gas includes a catalytic gas.

23. The apparatus according to claim 18 wherein the gas supply tube extends at an acute angle with respect to the direction from the arc discharge portion toward the capturer and is connected to the reaction tube.

24. The apparatus according to claim 19 wherein an inner tube smaller in diameter than the reaction tube is coaxially disposed in the reaction tube to extend over a length at least including the location where the gas supply tube is connected.

25. The apparatus according to claim 11 wherein a cross-sectional area of the reaction tube around the arc discharge portion is defined by a thinner portion smaller in cross-sectional area than a remaining part of the reaction tube.

26. The apparatus according to claim 25 wherein the thinner portion extends up to slightly before the capturer such that the reaction tube increases in diameter immediately before the capturer.

* * * * *